United States Patent [19]

Dion et al.

[11] Patent Number: 5,212,240

[45] Date of Patent: May 18, 1993

[54] HEAT RESISTANT STYRENIC POLYMER BLENDS

[75] Inventors: Robert P. Dion; John M. Warakomski, both of Midland, Mich.

[73] Assignee: The Dow Chemical Company, Midland, Mich.

[21] Appl. No.: 688,229

[22] Filed: Apr. 22, 1991

[51] Int. Cl.⁵ .......................... C08L 9/00; C08L 51/00
[52] U.S. Cl. ....................... 525/86; 525/77; 525/78
[58] Field of Search ............... 525/86, 77, 78

[56] References Cited

U.S. PATENT DOCUMENTS

| | | | |
|---|---|---|---|
| 2,417,607 | 3/1947 | Mowry | 526/300 |
| 2,439,226 | 4/1948 | Seymour | 526/300 |
| 2,455,342 | 11/1948 | Seymour | 526/300 |
| 4,267,282 | 5/1981 | Tokas | 525/86 |
| 4,367,310 | 1/1983 | Henton | 525/67 |
| 4,423,188 | 12/1983 | Witschard | 525/71 |
| 4,427,832 | 1/1984 | Yagi et al. | 525/238 |
| 4,536,545 | 8/1985 | Olener et al. | 525/75 |
| 4,537,933 | 8/1985 | Walker et al. | 525/85 |

FOREIGN PATENT DOCUMENTS 1264767 10/1968 Fed. Rep. of Germany .

*Primary Examiner*—Nathan M. Nutter
*Assistant Examiner*—T. Mosley

[57] ABSTRACT

Disclosed are styrenic polymer blends, preferably rubber modified styrenic polymer blends, containing a binary styrene/acrylonitrile copolymer in combination with a fumaronitrile-containing styrenic copolymer. The preferred rubber modified styrenic polymer blends hereof have improved heat and impact resistances and are composed of a binary styrene/acrylonitrile copolymer grafted to and/or occluded within a rubber substrate and dispersed in a matrix phase copolymer comprising fumaronitrile, styrene, and, optionally, acrylonitrile such that the concentration of acrylonitrile in the grafted and/or occluded portion of the rubber modifier is at least equal to and is preferably greater than the total concentration of fumaronitrile and acrylonitrile in the copolymer of the matrix phase.

12 Claims, No Drawings

HEAT RESISTANT STYRENIC POLYMER BLENDS

BACKGROUND OF THE INVENTION

This invention pertains generally to styrenic polymer blends or polyblends and particularly to rubber modified styrenic polymer blends or polyblends with improved properties.

Rubber modified styrenic polymer compositions are well-known in the prior art. These rubber modified compositions are commonly known and referred to as graft copolymers or polyblends. The rubber modified styrenic polymer compositions have improved properties as compared to the non-modified styrenic polymers. Styrene (S) acrylonitrile (AN) copolymers (SAN), for instance, have improved toughness and high impact resistance when they are rubber modified to get materials called acrylonitrile-butadiene-styrene copolymers (ABS). This improvement in the properties results from rubber particles being dispersed in the SAN continuous or matrix phase. ABS polymers have become particularly important in the automobile and appliance industries.

It is known that improved physical properties such as excellent thermal stability and improved heat resistance are obtained when fumaronitrile is copolymerized with a vinyl aromatic hydrocarbon like styrene. U.S. Pat. No. 2,417,607 describes such copolymerization products. U.S. Pat. No. 2,439,226 describes that a copolymer, for example, of alpha-paradimethyl substituted styrene with a mixture of acrylonitrile and fumaronitrile has better heat-resistance than a copolymer of alpha-paradimethylstyrene and acrylonitrile.

Styrene acrylonitrile copolymers (SAN) have been rubber modified with grafted rubber concentrates with fumaronitrile styrene (FNS) copolymer in the grafted phase to give styrenic polymer blends that are colorless and have enhanced solvent resistance. Such styrenic polymer blends have been described in German Patent 1 264 767. This improvement in the property results from FNS grafted rubber particles being dispersed in a SAN matrix phase. These polymer blends have relatively minute weight percent of fumaronitrile which although sufficient to impart improved solvent resistance is not sufficient to impart significantly improved heat resistance to these polymer blends.

It is an object of the present invention to obtain rubber modified styrenic copolymer resins containing fumaronitrile (FN), having binary SAN copolymer grafted rubber concentrate dispersed in a SFN or a SANFN copolymer matrix phase with improved properties for applications such as automobile body panels. Both heat and solvent resistance are needed, as the body panel substrate is subjected to paint solvents and paint oven temperatures of 230°–270° F. during fabrication, and occasional exposure to stress crack agents as a finished part.

Since both rubber dispersion and the adhesion of the grafted rubber phase to the continuous matrix phase in impact modified blends determine the morphology, failure mechanisms, and ultimately, the physical properties of the blends, it is yet another object of the present invention to provide rubber-modified blends having improved compatibility or miscibility as between the SFN or SANFN copolymer matrix and the SAN copolymer in the graft phase of the impact modifier. Phase separation is undesirable as it causes poor toughness in rubber reinforced polymeric blends. Accordingly, it is highly desirable to provide polyblends which have improved compatibility between the continuous matrix and the dispersed grafted rubber phases and which thereby exhibit enhanced toughness and impact resistance.

Improved compatibility as between an SAN binary copolymer phase and an SFN or SANFN phase is also important to physical property and performance characteristics in the context of non-rubber modified polymer blend compositions containing the indicated types of individual copolymer ingredients. Accordingly, it is another object of the present invention to provide non-rubber modified polymer blends of the type mentioned which have improved compatibility as between the individual polymer ingredients and which thereby exhibit improved physical properties.

SUMMARY OF THE INVENTION

Applicants have discovered that the compatibility or miscibility between a binary SAN copolymer and a binary SFN or a ternary SANFN copolymer is maximized when the AN content of said binary SAN copolymer in weight percent based on the weight of said binary SAN copolymer is between y and x wherein:

$y = \%$ AN $+ \%$ FN content of the SANFN or SFN copolymer, and $x = \%$ AN $+ (1.3 \times \%$ FN in the SANFN or SFN copolymer$) + 7$.

The Applicants have also discovered that styrenic polymeric blends with an SAN grafted rubber ingredient dispersed in SANFN or SFN matrix, which embody the concentration of AN in SAN grafted phase in the ranges found to be desirable for maximized compatibility between the SAN copolymer and a SFN or a SANFN copolymer, have a better toughness/heat resistance balance than blends wherein the AN content of the SAN copolymer fails to satisfy the foregoing formula.

The present invention, thus is a styrenic polymer blend comprising:

A. from about 5 to about 95% by weight based on the total weight of the blend of a fumaronitrile-containing styrenic copolymer having polymerized therein,
 i. from about 45 to about 95% by weight, based on the total weight of the fumaronitrile-containing copolymer, of styrene,
 ii. from about 5 to about 30% by weight based on the total weight of said fumaronitrile-containing copolymer, of fumaronitrile, and
 iii. from about 0 to about 25% by weight, based on the total weight of said fumaronitrile-containing copolymer, of acrylonitrile; and B. from about 5 to 95% by weight based on the total weight of the blend, of a binary copolymer having copolymerized therein:
 i. acrylonitrile in an amount, based on the total weight of the binary copolymer, between y % and x % wherein:
  $y = ($AN % in copolymer A $+$ FN % in copolymer A$)$, and
  $x = ($AN % in copolymer A $+ 1.3 \times$ FN % in copolymer A$) + 7$, and
 ii. styrene in an amount constituting the balance of said binary copolymer.

The present invention also relates in one of its especially preferred embodiments to a rubber modified styrenic polymer blend comprising:

A. from about 25 to about 90% by weight based on the total weight of the blend of a fumaronitrile containing matrix phase styrenic copolymer having polymerized therein,
  i. from about 45 to about 95% by weight, based on the total weight of the matrix phase copolymer, of styrene,
  ii. from about 5 to about 30% by weight, based on the total weight of the matrix phase copolymer, of fumaronitrile, and
  iii. from about 0 to about 25% by weight, based on the total weight of the matrix phase copolymer, of acrylonitrile; and
B. from about 10 to 75% by weight based on the total weight of the blend, of a grafted elastomer component comprising:
  a. from about 5 to about 45% by weight based on the total weight of the blend, of a grafted and/or occluded binary copolymer having copolymerized therein:
    i. acrylonitrile in an amount, based on the total weight of the binary copolymer between y % and x % wherein:
       y = (AN % in copolymer A + FN % in copolymer A), and
       x = (AN % in copolymer A + 1.3 × FN % in copolymer A) + 7, and
    ii. styrene in an amount constituting the balance of said binary copolymer; and
  b. an elastomer substrate consisting of 5–30% by weight based on the total weight of the blend.

DETAILED DESCRIPTION OF THE INVENTION

Styrenic polymer blends according to the present invention comprise:

a) a fumaronitrile-containing styrenic copolymer component, and b) a binary SAN copolymer component which may optionally be rubber modified by having said binary copolymer grafted to and/or occluded within an elastomer core or substrate.

It should be noted that as used herein the terms "polymer" and "polymerization" are generic, and include either or both of the more specific cases of "homo- and inter-polymers" and "homo- and inter polymerization", respectively. It should also be noted that "copolymer" is generic, and includes both binary or ternary copolymers.

The fumaronitrile-containing styrenic copolymer component of the present invention is a copolymer which is composed, in polymerized form, of styrene in combination with fumaronitrile and, optionally, with acrylonitrile. Broadly, the copolymer is from about 45 to about 95% by weight styrene (S), from about 5 to about 30% by weight fumaronitrile (FN) and from about 0 to about 25% by weight acrylonitrile (AN). Preferably, the copolymer of the FN-containing copolymer is 60–75% by weight styrene, 10–20% by weight acrylonitrile, and 10–30% by weight fumaronitrile.

The copolymer of styrene, fumaronitrile and, optionally, acrylonitrile is generally prepared by thermal or catalytic polymerization of the monomer constituents. The polymerization can be done by bulk or emulsion or suspension methods. Preferably, the polymerization of such monomer constituents is done by a mass or solution method. The FN-containing copolymer may be produced in a reaction separate from the production of the binary SAN copolymer or both such components can alternatively be produced as part of a simple polymerization by way of a selective (i.e., staged or sequential) FN monomer and AN monomer feed technique.

Fumaronitrile is commercially available from Takeda Chemical Industries, and can be purchased through American Tokyo Kasei, in a form which is about 99% pure. Styrene and acrylonitrile are available commercially for use as starting materials.

Especially preferred polymer blend compositions hereof are those wherein the SAN copolymer is rubber modified and wherein the grafted and/or occluded SAN copolymer component constitutes from 5–45% by weight based on the total weight of the blend. The grafted and/or occluded SAN copolymer consists of a copolymer having polymerized therein acrylonitrile in an amount, based on the total weight of said SAN copolymer, between y % and x % wherein: y = (AN % in the FN-containing matrix phase copolymer + FN % in the FN-containing matrix phase copolymer), and x = AN % in FN-containing copolymer + (1.3 × FN % in the FN-containing copolymer) + 7, and styrene in an amount constituting the balance of the grafted and/or occluded SAN copolymer. Preferably, the minimum amount of acrylonitrile in the grafted and/or occluded binary SAN copolymer phase is greater than the total concentration of AN and FN in the matrix copolymer. The upper limit on the amount of acrylonitrile in the grafted and/or occluded phase is preferably equal to (the matrix phase AN % + 1.3 × matrix phase FN %) + 5%.

The rubber substrate to which the binary SAN copolymer is grafted and/or occluded typically constitutes 5–30% of the total weight of the blend. Examples of suitable rubbery polymers include homopolymers of 1,3 conjugated alkadiene monomers; copolymers of from 60 to 99 weight percent of said 1,3-conjugated alkadienes with from 1 to 40 weight percent of a monoethylenically unsaturated monomer such as for example, monovinylidene aromatic monomers (e.g., styrene, etc.) and ethylenically unsaturated nitriles such as acrylonitrile, methacrylonitrile, etc.; rubbery acrylate polymers; ethylene/propylene copolymer rubbers; and rubbery ethylene/propylene/non-conjugated diene copolymers. Especially preferred rubbery polymers for use herein include polymers composed of from 60 to 100 weight percent of 1,3-butadiene and from 0 to 40 weight percent of styrene and/or acrylonitrile.

In certain preferred embodiments hereof, the dispersed rubbery polymer particles can be of a sort which have a bimodal particle size distribution. Exemplary of such compositions are those wherein the rubbery particles are predominantly composed (e.g., from about 50 to about 90, preferably from about 65 to 75 weight percent on a total rubbery particle weight basis) of particles having volume average particle size of less than one micron (preferably from about 0.05 to about 0.8 micron) and wherein the remainder of said rubbery particles (e.g., from 10 to about 50, preferably from 25 to about 35, weight percent thereof) have a volume average particle size of about 1 micron or greater (preferably from about 1 to about 3 micron).

The rubber-modified SAN graft copolymer can suitably be prepared in any known manner by free radical polymerization of the selected comonomer materials in the presence of the modifying rubber material. Suitable techniques include conventional mass, solution, suspension or emulsion polymerization processes. Especially preferred for use herein are rubber-modified SAN graft copolymers prepared via emulsion polymerization techniques.

Mass polymerization generally results in grafted rubber particles containing occlusions of matrix polymers therein. The mass polymerization is a process wherein a previously-produced rubber is dissolved in a solution comprising one or more polymerizable monomers, which monomers are thereafter polymerized. The dispersed rubbery polymer particles of a mass polymerized graft copolymer component will typically have a volume average particle size of from about 0.4 to about 6 (preferably from about 0.7 to about 5) microns; and will generally constitute from about 3 to about 30 (preferably from about 5 to about 20) weight percent of said mass polymerized graft copolymer. Generally, the weight ratio of grafted and occluded SAN copolymer to rubbery polymer in a mass polymerized graft copolymer ranges from 1 to 3.

As noted above, the rubber-modified binary SAN copolymer of the present invention is preferably prepared by emulsion graft polymerization of a rubber substrate in the form of an aqueous rubber latex. In the emulsion process, after the rubber is made, styrene and acrylonitrile monomers are added to the rubber-containing latex and polymerized to form the graft portion as well as amounts of binary SAN matrix copolymer. The dispersed rubbery polymer particles of such emulsion polymerized graft copolymer typically have volume average particle size in the range from about 0.05 to about 1.0 (especially from about 0.15 to about 0.8) micron and will typically have a dispersed rubber polymer content of from about 35 to about 85 (preferably from about 40 to about 85 and most preferably from about 45 to about 80) weight percent on an emulsion polymerized graft copolymer weight basis. Generally, the weight ratio of grafted SAN copolymer to the rubbery polymer substrate in an emulsion polymerized graft copolymer ranges from 0.3 to 1.0.

As noted above, the SAN copolymer and the SFN or SANFN copolymer can be prepared separately or can, if desired in a given instance, be prepared within a single polymerization process using staged or sequential monomer feed techinques. However, the separate syntheses of the SFN or SANFN continuous phase and the rubber-containing binary SAN grafted and/or occluded copolymer phase allows for a large amount of controlled flexibility in the molecular design of the blend components and is, therefore, preferred in the practice of the present invention.

Blending of the binary SAN copolymer or the SAN-grafted and/or occluded rubbery polymer with the fumaronitrile-containing copolymer can be done by a variety of well-known methods, such as extrusion blending or mill rolling. When the polymer blend to be prepared is a rubber modified composition, the ratio of fumaronitrile-containing matrix to binary SAN copolymer-grafted rubber in the blend is typically in a range from 90:10 to 25:75 by weight. A more preferred ratio of matrix to grafted rubber in such a rubber-modified polymer blend is in a range from 80:20 to 35:65 by weight, particularly when the grafted rubber component employed is an emulsion polymerized graft copolymer of the sort described above. In this latter instance, the most preferred ratio of matrix to grafted rubbery polymer is in a range from 80:20 to 50:50 by weight.

The fumaronitrile-containing polyblends of this invention will generally comprise from about 2% to about 22% by weight of fumaronitrile based on the total weight of the blend to obtain improved heat resistance properties. It is preferred that the weight percent of fumaronitrile in the blend be in a range from about 4 to about 15.

The blends have utility in auto body panel applications; when glass filled, they can be used for instrument panels; and they can be used in polymer blend applications where increased heat and solvent resistance are desirable relative to standard SAN and/or ABS compositions.

A convenient criteria which can be used for determining miscibility of a SFN or SANFN copolymer with a binary SAN copolymer are glass transition temperatures (Tg), measured by differential scanning calorimetry (DSC). Since the glass transition temperatures of the SAN and SFN or SANFN are different, differentiating miscible, semi-miscible and immiscible pairs is possible. Immiscible pairs are defined as blends which exhibit the two glass transitions of the pure individual blend components. Semi-miscible pairs have two distinct transitions at temperatures between the glass transitions of the pure blend components, and miscible pairs have a single Tg with a value between those of the two blend components. Pair of materials which exhibit shoulders or one very broad transition are also considered to be semi-miscible.

For the purposes of the present invention, the binary SAN copolymer and fumaronitrile-containing copolymer compositions hereof are considered to be sufficiently miscible or compatible when the resulting blends thereof either have a single Tg or have two separate Tg's which are at least about 35% (preferably at least about 50% and more preferably at least about 75%) closer together than the original difference between the Tg's of the individual binary SAN copolymer and FN-containing copolymer blend components.

EXAMPLE

Three different SANFN terpolymers are examined for miscibility with binary SAN polymers of varying compositions. The three terpolymer compositions have S/AN/FN in weight ratios of 71/18/11, 70/13/17, and 64/20/16, respectively. The molecular weights and glass transition temperatures are summarized in Table 1. The binary styrene/acrylonitrile copolymers have acrylonitrile contents of 6, 25, 30, 34, 40, 42, 45 and 51 percent by weight. These resins are characterized by their molecular weights and glass transition temperatures in Table 2.

TABLE 1

| Styrene-Acrylonitrile-Fumaronitrile (SANFN) Terpolymers Used in This Study | | | | |
|---|---|---|---|---|
| S/AN/FN (weight %) | Mn (a) | Mw (a) | Mw/Mn | Tg °C. |
| 71/18/11 | 43 | 101 | 2.35 | 136 |
| 70/13/17 | 56 | 120 | 2.12 | 147 |
| 64/20/16 | 48 | 92 | 1.90 | 141 |

(a) in thousands

TABLE 2

Styrene-acrylonitrile (SAN) binary copolymers used in this study

| S/AN (weight %) | Mn (a) | Mw (a) | Mw/Mn | Tg °C. |
|---|---|---|---|---|
| 94/6 | 122 | 342 | 2.80 | 110 |
| 75/25 | 76 | 152 | 2.00 | 112 |
| 70/30 | 50 | 94 | 1.87 | 114 |
| 66/34 | 60 | 121 | 2.00 | 110 |
| 60/40 | 68 | 138 | 2.02 | 114 |
| 58/42 | 66 | 129 | 1.94 | 117 |
| 55/45 | 55 | 106 | 1.92 | 116 |
| 49/51 | 46 | 80 | 1.72 | 114 |

(a) in thousands

Polymer blends are prepared by solution blending of S/AN/FN and S/AN in methylene chloride and films are cast from the resulting solutions. The resultant films are then evaluated by DSC.

Table 3 lists the observed glass transition temperatures for the various blends. The miscible zone is the composition range where the separate glass transitions temperatures of the individual blend components have converged to a single value. The partially miscible zone is the composition range where two separate glass transition temperatures are still exhibited by the polymer blend but are moving toward each other.

TABLE 3

Tg (°C.) of 50/50 SAN/SANFN Blends by DSC

| S/AN/FN | 94/6 | 79/21 | 75/25 | 70/30 | 66/34 | 60/40 | 55/45 | 49/51 |
|---|---|---|---|---|---|---|---|---|
| 71/18/11 | 108 | 110 | 112 | 121 | 118 | 116 |  | 113 |
|  | 136 | 135 | 133 |  |  | 134 |  | 135 |
| 70/13/17 | 108 | 107 | 113 | 122 | 126 | 119 |  | 113 |
|  | 147 | 143 | 146 | sh$^a$ |  | 140 |  | 143 |
| 64/20/16 | 102 | 111 |  | 113 | 115 | 131 | 127 | 113 |
|  | 141 | 144 |  | 143 | 133 | 142 |  | 142 |

$^a$shoulder

Based upon the observed glass transition temperatures of the SAN/SANFN blends it can reasonably be stated that a region of substantially improved miscibility (or a miscibility "window") falls within the zone wherein:

$$\frac{(\Delta T_{g_1} - \Delta T_{g_2})}{\Delta T_{g_1}} \text{ is at least 1/3 or greater;}$$

where $\Delta T_{g_1}$ is the difference between the glass transition temperatures of the individual blend components and $\Delta T_{g_2}$ is the difference between the two observed glass transition temperatures (if two distinct Tg's are observed) of the blend formed from said blend components. This region or "window" of improved miscibility constitutes a useful composition range because of the attendant improvement in properties of the blends which is observed. The most optimal composition is obtained at approximately the mid-point of the miscibility range where there is only one glass transition temperature.

Table 4 summarizes the improved miscibility regions for the three SANFN terpolymers tested based upon the observed glass transition temperatures, midpoint of miscibility and the total amount of AN and FN in the SANFN copolymer.

TABLE 4

| S/AN/FN (wt %) | % AN in S/AN (region of improved miscibility) | % AN in S/AN (optimum miscibility) | AN + FN in S/AN/FN |
|---|---|---|---|
| 71/18/11 | 26–38 | 32 | 29 |
| 70/13/17 | 29–42 | 35.5 | 30 |
| 64/20/16 | 35–48 | 41.5 | 36 |

Comparison of the optimum miscibility for the two SANFN copolymers containing 11 and 17 weight percent FN, respectively, with SAN having different AN contents indicates that for SAN to have maximum compatibility with the SANFN, the AN content of the SAN should be higher than the combined AN+FN content of the SANFN component. The third SANFN copolymer examined being even higher in total nitrile monomer content requires even higher AN content in the SAN for optimized miscibility.

Broadly, the percent of AN present in the binary SAN copolymer for improved miscibility i.e, "miscibility window", for the three different SANFN compositions is observed to be 32±6, 35.5±6.5, and 41.5±6.5 respectively. These miscibility observations generally indicate that the percent of AN in SAN for maximizing the compatibility of SAN with SANFN or SFN copolymer should typically be between y % and x % wherein:

y = % AN + % FN content of the SANFN or SFN copolymer, and x = % AN + (1.3 × % FN in the SANFN or SFN copolymer) + 7.

Based on the observed miscibility ranges of binary SAN and SANFN copolymers, the chemical composition of the binary SAN graft copolymer in the dispersed phase of a rubber-modified ABS composition is varied with respect to that of the copolymer SANFN in the matrix phase to study the compatibility of an emulsion polymerized binary SAN-grafted rubber concentrate (GRC) with a SANFN rigid phase within a heat resistant fumaronitrile-acrylonitrile-butadiene-styrene (FABS) resin.

In the examples which follow, two different binary SAN-grafted GRCs having different AN content in the grafted SAN phase are blended with a ternary SANFN copolymer containing S/AN/FN in a 64/20/16 weight ratio. Styrene/acrylonitrile in the ratios of 71/29 and 52/48 respectively, is used as grafted phase polymer and its miscibility with the matrix phase SANFN is studied by comparing the physical properties of the resulting blends. Using the formula given hereinabove, for SAN to be miscible with the SANFN, AN weight percent in SAN should be between 36 and 48. Thus 71/29 SAN would not miscible with the 64/20/16 weight ratio SANFN, but 52/48 SAN would be partially miscible.

COMPARATIVE EXAMPLE

Preparation of emulsion polymerized styrene/acrylonitrile (71/29) grafted butadiene rubber concentrate (GRC)

A twenty-gallon, glass lined latex reactor was charged with 38417 g of bimodal butadiene rubber latex (1200/6500 Angstrom, 32.4% active), and 4512 g of deionized water. The rubber latex used was 93/7 by weight butadiene/styrene. The mixture was purged with nitrogen and then evacuated with a water aspirator three times at room temperature. The reactor was heated to 90° C. and stirred at 250 rpm. An aqueous feed consisting of 2067 g of deionized water, 43.7 g of sodium persulfate as the radical initiator and 877 g of 43% sodium n-dodecylbenzene sulfonate (Calsoft L-40 soap) as the emulsifying agent and a monomer feed consisting of 10222 g of styrene, 3975 g of acrylonitrile were started simultaneously. The aqueous feed was added at 656 g/hr for 4.25 hours. The monomer stream was added at 3809 g/hr for 3.75 hours. An anti-foaming agent (50 g Dow Corning H-10, 15% active) were added, and 7000 ml of volatiles were steam distilled from the mixture. The reaction ran to 96% conversion, and the extractable styrene-acrylonitrile rigid phase had a number average molecular weight ($M_n$) of 35200, and weight average molecular weight ($M_w$) of 90300. The grafted SAN copolymer of this GRC has a styrene content of 71% and an acrylonitrile content of 29%.

Preparation of styrene-acrylonitrile-fumaronitrile copolymer (S/AN/FN in weight ratio 64/20/16)

Fumaronitrile was manufactured by Takeda Chemical Industries, purchased through American Tokyo Kasei, was found to be 99% pure, and used as received. The feed tank of the reactor was sparged with nitrogen and kept under positive pressure. Monomer feed consisting of 45.0% Styrene, 18.8% acrylonitrile and 11.2% fumaronitrile and 25.0% ethyl benzene by weight was dissolved in a polyethylene jug, pumped to a feed tank by vacuum, and fed to the reactor at the rate of two pounds per hour, corresponding to residence time of one hour. Polymerization was done thermally, the reactor being operated at 161° C. and 110 pounds per square inch, and recirculated at 245 revolutions per minute. The coil reactor used for continuous polymerization is described in U.S. Pat. No. 2,769,804.

The polymerization was taken to 44% solids and the partial polymer was devolatilized at 245° C. and 24 millimeters of mercury vacuum. The copolymer was then pelletized.

Molecular weights as determined by size exclusion chromatography in tetrahydrofuran were $M_n=48,500$ and $M_w=92,000$. Composition determined by carbon-13 nuclear magnetic resonance spectroscopy was found to be 64% styrene, 20% acrylonitrile, and 16% fumaronitrile. The glass transition temperature determined by differential scanning calorimetry at a rate of 20° C./minute was 141° C. The melt flow rate at 230° C. and 3800 grams (Condition "I") was 1.9 grams/10 minutes.

EXAMPLE 1

The comparative example was repeated in substantially the same way except the GRC used was grafted with styrene acrylonitrile copolymer in weight ratios of 52/48 of styrene/acrylonitrile, respectively.

Preparation of Blends

The above-described grafted rubber concentrates were isolated from latex in solid form by a freeze-thaw cycle followed by centrifugation and air drying. The resultant powder was physically mixed with the aforementioned FN/S/AN terpolymer pellets in ratio such that the total blend contained 20 weight percent of the 97/3 butadiene/styrene copolymer rubber. The mixture was then pelletized and fabricated. Test specimens were tested according to ASTM D-256 (impact), and ASTM D-648 (DTUL). Miscibility was determined from glass transition data generated with a Dupont 1090 differential scanning calibrated with Indium standards, at a scanning rate of 20° C./minute.

TABLE 5

| Graft composition (wt % AN) | Tg (°C.) | IZOD[a] | 66 PSI dtul[b] | MISCIBLE |
|---|---|---|---|---|
| 29 | 143 112 | 2.2 | 243 | NO |
| 48 | 139 121 | 2.8 | 245 | PARTIALLY |

[a]Impact Strength in ft. lbs/in of notch
[b]Distortion Temperature Under Load in °F.

Table 5 illustrates the effect on physical properties of the polymeric blend as a result of the varying composition of SAN grafted phase. As can be seen, the blend prepared using an SAN-grafted rubber having an AN content less than the combined AN+FN content of the SANFN terpolymer has less impact resistance. As can also be seen, the more miscible the blend is, the tougher it is.

What is claimed is:
1. A styrenic polymer blend comprising:
   A. from about 5 to about 95% by weight based on the total weight of the blend of a fumaronitrile-containing styrenic copolymer having polymerized therein,
      i. from about 45 to about 95% by weight, based on the total weight of said copolymer, of styrene,
      ii. from about 5 to about 30% by weight based on the total weight of said copolymer, of fumaronitrile, and
      iii. from about 0 to about 25% by weight, based on the total weight of said copolymer, of acrylonitrile; and
   B. from about 5 to 95% by weight based on the total weight of the blend, of a binary copolymer having polymerized therein:
      i. acrylonitrile, for compatibility with the fumaronitrile-containing styrenic copolymer, in an amount, based on the total weight of the binary copolymer, between y % and x % wherein:
         y = (AN % in copolymer A + FN % in copolymer A), and
         x = (AN % in copolymer A + 1.3×FN % in copolymer A) + 7, and
      ii. styrene in an amount constituting the balance of said binary copolymer.
2. A rubber modified styrenic polymer blend comprising:
   A. from about 25 to about 90% by weight based on the total weight of the blend of a fumaronitrile-containing matrix phase styrenic copolymer having polymerized therein, i. from about 45 to about 95% by weight, based on the total weight of the matrix phase copolymer, of styrene, ii. from about 5 to about 30% by weight, based on the total weight of the matrix phase copolymer, of fumaronitrile, and iii. from about 0 to about 25% by weight, based on the total weight of the matrix phase copolymer, of acrylonitrile; and B from about 10 to 75% by weight based on the total weight of the blend, of a grafted elastomer component comprising:

a. from about 5 to about 45% by weight based on the total weight of the blend, of a grafted/or occluded binary copolymer having copolymerized therein:

i. acrylonitrile, for compatibility with the fumaronitriile-containing matrix phase styrenic copolymer, in an amount, based on the total weight of the binary copolymer, between y % and x % wherein:

y = (AN % in copolymer A + FN % in copolymer A), and x = (AN % in copolymer A + 1.3 × FN % in copolymer A) + 7 and ii. styrene in an amount constituting the balance of said binary copolymer; and b. an elastomer substrate which constitutes 5–30% by weight of the total weight of the blend.

3. The styrenic polymer blend of claim 2, wherein the percent of AN in the binary copolymer, on a binary copolymer weight basis, is greater than the total percentage of combined AN and FN in the copolymer A on a copolymer A weight basis.

4. The styrenic polymer blend of claim 2, wherein the elastomer substrate is a butadiene/styrene copolymer rubber.

5. The styrenic polymer blend of claim 2, wherein the copolymer A has 60–75% by weight of styrene, 10–20% by weight of AN, and 10–30% by weight of FN.

6. The styrenic polymer blend of claim 2, wherein the grafted elastomer component is a mass polymerized graft copolymer with rubber particles containing occlusions of SAN copolymer therein.

7. The styrenic polymer blend of claim 6, wherein grafted elastomer contains from about 3 to about 30 percent by weight of rubber.

8. The styrenic polymer blend of claim 7, wherein the rubber has a volume average particle size from about 0.4 to about 6 microns.

9. The styrenic polymer blend of claim 2, wherein the grafted elastomer component is an emulsion polymerized graft copolymer with rubber particles having SAN copolymer grafted thereon.

10. The styrenic polymer blend of claim 9, wherein grafted elastomer contains from about 35 to about 85 percent by weight of rubber.

11. The styrenic polymer blend of claim 10, wherein the rubber has a volume average particle size from about 0.05 to about 1.0 microns.

12. The styrenic polymer blend of claim 2, wherein the blend has a single glass transition temperature.

* * * * *

UNITED STATES PATENT AND TRADEMARK OFFICE
CERTIFICATE OF CORRECTION

PATENT NO. : 5,212,240

DATED : May 18, 1993

INVENTOR(S) : Robert P. Dion; John M. Warakomski

It is certified that error appears in the above-identified patent and that said Letters Patent is hereby corrected as shown below:

Column 12, Claim 12, line 30, "claim 2" should correctly appear as --claim 1--.

Signed and Sealed this

Eighth Day of February, 1994

Attest:

BRUCE LEHMAN

Attesting Officer

Commissioner of Patents and Trademarks